US005263459A

United States Patent [19]

Talaski

[11] Patent Number: 5,263,459

[45] Date of Patent: Nov. 23, 1993

[54] FUEL DELIVERY WITH SELF-PRIMING FUEL PUMP

[75] Inventor: Edward J. Talaski, Caro, Mich.

[73] Assignee: Walbro Corporation, Cass City, Mich.

[21] Appl. No.: 982,455

[22] Filed: Nov. 27, 1992

[51] Int. Cl.[5] .................... F02M 33/02; F16K 24/04; F04B 17/00

[52] U.S. Cl. .................................... 123/516; 417/435; 137/197

[58] Field of Search ...................... 123/509, 514, 516; 417/435, 307, 423.3; 137/197, 199, 572

[56] References Cited

U.S. PATENT DOCUMENTS

| | | | |
|---|---|---|---|
| 2,946,475 | 7/1960 | Rockelman | 137/197 |
| 3,033,911 | 5/1962 | Duddy | 137/197 |
| 3,267,987 | 8/1966 | Friedl et al. | 137/197 |
| 3,575,521 | 4/1971 | Porter et al. | 137/197 |
| 4,205,947 | 6/1980 | Ruhl et al. | 417/435 |
| 4,218,196 | 8/1980 | Ohnishi | 417/435 |
| 4,309,155 | 1/1982 | Heinz et al. | 417/435 |
| 4,569,637 | 2/1986 | Tuckey | 417/435 |
| 4,596,519 | 6/1986 | Tuckey | 418/15 |
| 4,844,704 | 7/1989 | Jiro | 417/435 |
| 4,878,518 | 11/1989 | Tuckey | 137/448 |
| 4,922,959 | 5/1990 | Sasaki et al. | 137/587 |
| 4,934,914 | 6/1990 | Kobayashi et al. | 417/435 |
| 4,972,869 | 11/1990 | Takasaki | 137/199 |
| 4,974,570 | 12/1990 | Szwargulski et al. | 123/514 |
| 5,018,502 | 5/1991 | Humpl et al. | 123/509 |
| 5,039,284 | 8/1991 | Talaski | 417/366 |
| 5,070,849 | 12/1991 | Rich et al. | 123/509 |
| 5,095,880 | 3/1992 | Ricks | 123/516 |
| 5,146,901 | 9/1992 | Jones | 123/514 |

*Primary Examiner*—E. Rollins Cross
*Assistant Examiner*—Thomas Moulis
*Attorney, Agent, or Firm*—Barnes, Kisselle, Raisch, Choate, Whittemore & Hulbert

[57] ABSTRACT

A fuel delivery system for internal combustion engines that includes a fuel pump module adapted to be disposed within a fuel tank, with a pump inlet disposed at a lower portion of the tank for drawing fuel therefrom and a pump outlet for delivering fuel under pressure to the engine. An air/vapor purge valve is operatively coupled to the pump outlet. The purge valve is constructed to be open when air and/or vapor is pumped by the fuel pump to purge such air and/or vapor to the surrounding tank, and to be responsive to presence of liquid fuel under pressure at the pump outlet to close the purge valve and prevent passage of liquid fuel therethrough to the surrounding tank.

9 Claims, 3 Drawing Sheets

FUEL DELIVERY WITH SELF-PRIMING FUEL PUMP

The present invention is directed to fuel delivery systems for automotive engine and like applications, and more particularly to a fuel pump module that includes an electric-motor fuel pump mounted within an in-tank canister.

BACKGROUND AND OBJECTS OF THE INVENTION

U.S. Pat. No. 4,878,518 discloses a fuel delivery system for internal combustion engines that comprises a canister for positioning within a fuel tank. The canister has a lower end with a fuel opening and an internal wall spaced from such lower end dividing the canister into upper and lower fuel chambers. An electric-motor fuel pump is positioned within the upper chamber and has a fuel inlet, a primary fuel outlet for feeding high-volume fuel under pressure to an engine, and a secondary fuel outlet for supplying fuel under pressure at smaller volume than the primary outlet. A fluid conduit extends through the canister internal wall, and has an inlet end in the lower chamber and an outlet end positioned in the upper chamber. A nozzle couples the secondary pump outlet to the conduit for aspirating fuel through the conduit from the lower chamber to the upper chamber. Thus, any vapor collected in the lower chamber is entrained in aspirated fuel and fed to the upper chamber, where it is free to vent to the fuel tank through the open upper end of the canister.

Although fuel delivery systems of the type disclosed in the noted patent have enjoyed acceptance and success, further improvements remain desirable. For example, one acceptance test that is particularly difficult for conventional fuel delivery systems is the so-called priming condition test in which the fuel canister and tank are allowed to run dry, and the tank is then filled with a small quantity such as one gallon of fuel. When it is then attempted to start the engine, the pump is required to purge air and fuel vapor from within itself, draw fuel from the relatively low level in the surrounding tank, and prime itself for delivery of fuel under pressure to start the engine. It is a general object of the present invention to provide a fuel delivery system, and particularly an in-tank fuel module of the type disclosed in the above-noted patent, that possesses enhanced capability for purging air and vapor, and priming itself, when fuel in the surrounding tank is at a low level.

SUMMARY OF THE INVENTION

A fuel delivery system for internal combustion engines in accordance with the present invention includes a fuel pump module adapted to be disposed within a fuel tank, with a pump inlet disposed at a lower portion of the tank for drawing fuel therefrom and a pump outlet for delivering fuel under pressure to the engine. An air/vapor purge valve is operatively coupled to the pump outlet. The purge valve is constructed to be open when air and/or vapor is pumped by the fuel pump to purge such air and/or vapor to the surrounding tank, and to be responsive to presence of liquid fuel under pressure at the pump outlet to close the purge valve and prevent passage of liquid fuel therethrough to the surrounding tank.

In the preferred embodiments of the invention, the fuel pump module includes a closed canister and an electric-motor fuel pump disposed within the canister. The air/vapor purge valve opens externally of the canister into the surrounding fuel tank for venting air and fuel vapor to the surrounding tank, rather than into the canister, during the pump priming/purging operation. In separate embodiments of the invention, the purge valve is disposed either externally of the canister but within the surrounding tank, or on the fuel pump itself and extending through the wall of the canister to open into the surrounding tank. The purge valve itself comprises a valve element urged by a spring toward the pump outlet. There is sufficient clearance between the valve element and the surrounding passage to form a leakage path for passage of air and fuel vapor, but insufficient to permit passage of liquid fuel under pressure against the force of the spring.

BRIEF DESCRIPTION OF THE DRAWINGS

The invention, together with additional objects, features and advantages thereof, will be best understood from the following description, the appended claims and the accompanying drawings, in which:

DETAILED DESCRIPTION OF PREFERRED EMBODIMENTS

Figure 1:
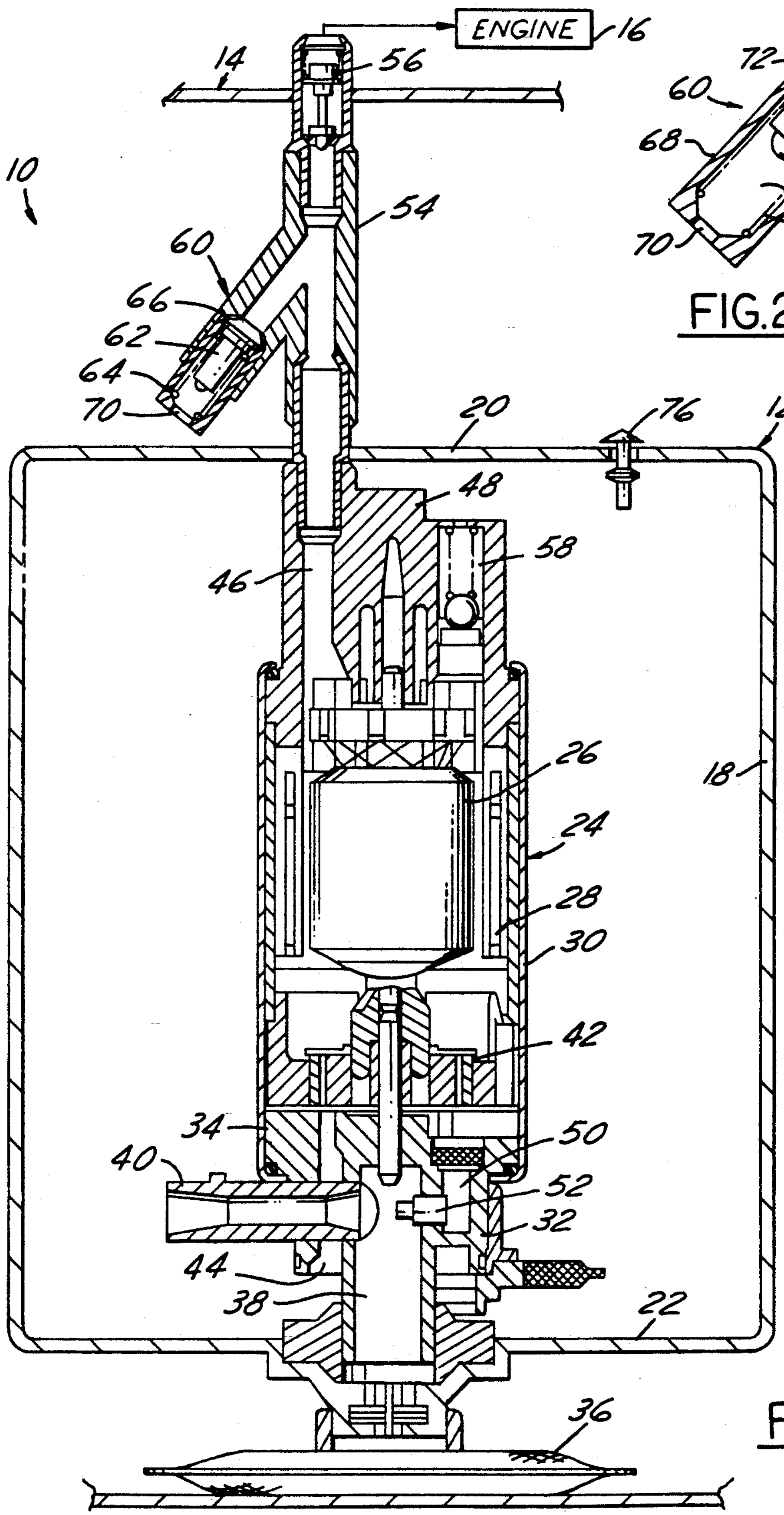
FIG. 1 is a fragmentary sectional view in side elevation of a fuel delivery system in accordance with a presently preferred embodiment of the invention.

FIG. 1 illustrates a fuel delivery system 10 in accordance with a presently preferred embodiment of the invention as comprising a fuel pump module 12 disposed within a fuel tank 14 for delivering fuel under pressure from the tank to an internal combustion engine 16. Fuel pump module 12 includes a closed generally cylindrical canister 18 having a top wall 20 and a bottom wall 22 adjacent to the bottom of fuel tank 14. An electric-motor fuel pump 24 comprises a armature 26 and a surrounding stator 28 disposed within a generally cylindrical housing or case 30. An inlet module 32 projects through canister wall 22 from the lower end cap 34 of pump 24 to receive fuel from the surrounding tank through a filter bag 36. Inlet module 32 has a fuel inlet conduit or passage 38 coupled to filter 36 through bottom wall 22, and a laterally extending venturi passage 40 that opens into the interior of canister 18. Armature 26 is coupled to a gear pumping mechanism 42 for drawing fuel through an inlet passage 44 from within canister 18, and delivering fuel under pressure through the interior of housing 30 to an outlet passage 46 in the upper pump end cap 48. A secondary pump outlet 50 feeds a lesser quantity of fuel under pressure to a nozzle 52, which is aligned with venturi passage 40 across passage 38 for aspirating fuel through filter 36 and passage 38 into the interior of canister 18.

Outlet passage 48 is connected through an outlet conduit 54 to a check valve 56, and thence by means of suitable fuel lines to engine 16. Check valve 56 prevents reverse flow of fuel from engine 16 to module 12 when pump 24 is de-energized. A pressure relief valve 58 is carried by outlet end cap 48 for venting excess fuel into the surrounding canister 18 in the event of fuel overpressure within pump 24. To the extent thus far described, fuel delivery system 10 and module 12 are substantially similar to those disclosed in above-noted U.S. Pat. No. 4,878,518. Fuel pump 24 itself is similar to that disclosed in U.S. Pat. No. 4,596,519. It will be appreciated as the description unfolds, however, that the principles of the present invention are in no way limited to these specific types of fuel modules and fuel pumps.

In accordance with a first aspect of the present invention, an air/vapor purge valve 60 is operatively coupled to the outlet of pump 24 by communication with outlet conduit 54 between upper canister wall 20 and the upper wall of fuel tank 14. Valve 60 (FIGS. 1 and 2) includes a valve element 62 and a coil spring 64 captured by a retainer 66 within a sleeve fitting 68. Coil spring 64 is captured in compression so as to urge valve element 62 toward outlet conduit 54 against retainer 66. Retainer 66, which may be a snap ring or other suitable device, permits passage of both liquid and vapor therethrough. The opposing end of sleeve fitting 68 opens at 70 to fuel tank 14 externally of canister 12.

There is a small leakage gap or path 72 between the radial periphery of valve element 62 and the surrounding portion of the passage 74 through sleeve 68. Gap 72 is of sufficient size to permit free passage of air and/or fuel vapor past valve element 68. However, when pump 24 pumps liquid fuel to outlet conduit 54 and valve 60, the dimension of gap 72 is insufficient to permit flow of substantial quantities of fuel therepast, so the fuel under pressure urges the opposing end of element 62 against spring 64 into seating engagement with opening 70 so as to block flow of liquid fuel through valve 60. A flapper or other suitable one-way valve 76 is carried by upper canister wall 20. Valve 76 is closed by force of gravity to prevent entry of fuel, vapor or air from the surrounding tank, but is opened at relatively low pressure on the order of 5 psig or less to vent air and/or vapor pressure from within canister 12 to surrounding tank 14.

Thus, in operation, when pump 24 is initially energized, any air or fuel vapor within pump housing 30 is pumped by mechanism 42 through valve 60 and into the surrounding fuel tank. Pump 24 also draws air or fuel vapor from within canister 18, creating a negative pressure or suction with respect to the surrounding fuel tank so as to draw fuel from the surrounding tank into the fuel canister. When liquid fuel reaches pump inlet 44, such liquid fuel is pumped by pump 24 to close valve 60, and also to cooperate with nozzle 52 and venturi passage 40 to aspirate additional fuel into the fuel canister. Thus, air and/or fuel vapor is purged from pump 24, and pump 24 is self-priming.

Figure 2:
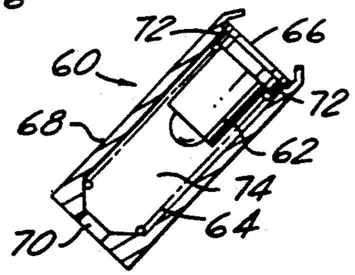
FIG. 2 is a sectional view in side elevation of the purge valve illustrated in FIG. 1.
Figure 3:
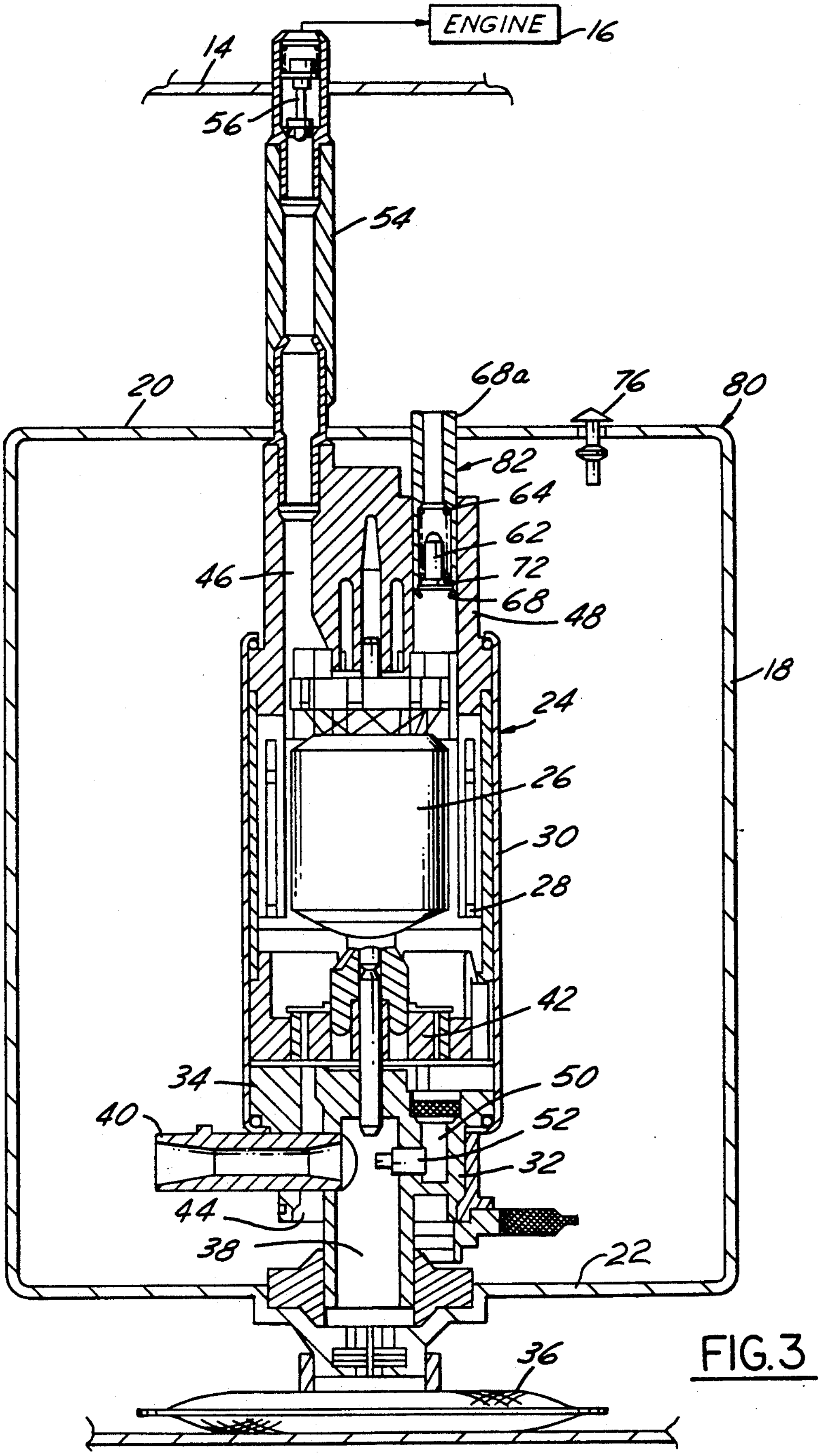
FIGS. 3 and 4 are fragmentary sectional views in side elevation of respective alternative embodiments of the invention.
Figure 4:
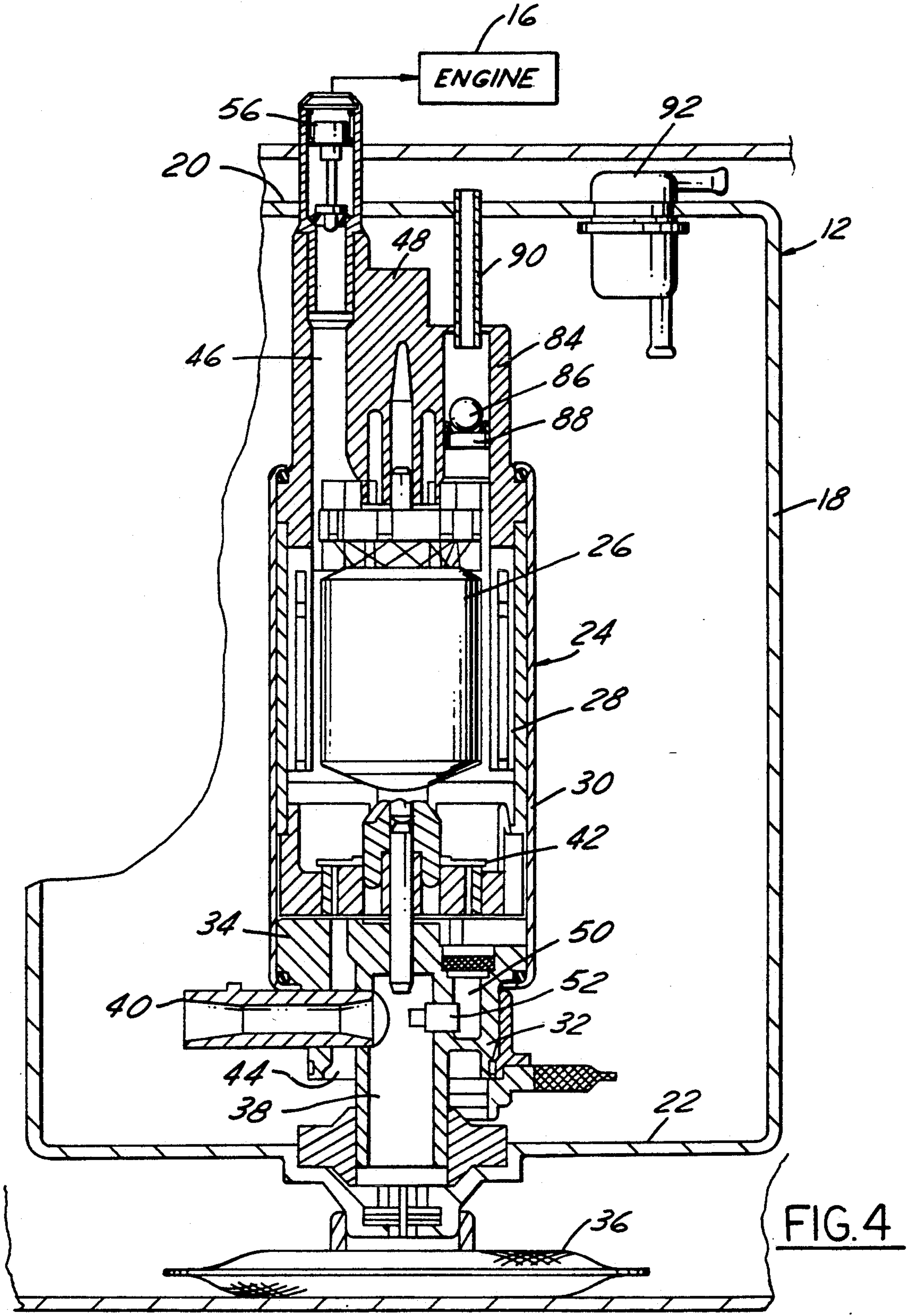

FIGS. 3 and 4 illustrate modified embodiments of the invention, in which reference numerals identical to those employed in connection with FIGS. 1 and 2 indicate identical components. In fuel module 80 of FIG. 3, the air/vapor purge valve 82 is carried by pump outlet end cap 48 in place of valve 58 (FIG. 1), and is operatively coupled to pump outlet 46 through the interior of pump housing 30, which contains fuel and/or vapor at outlet pressure. The sleeve fitting 68*a* of valve 82 extends through upper canister wall 20 so as to vent air and/or vapor to fuel tank 14 externally of canister 18. Otherwise, valve 82 is similar to valve 60 hereinabove discussed, and operates in a similar manner.

FIG. 4 illustrates a fuel delivery system in which the spring-biased purge valve 82 of FIG. 3 is replaced by a gravity operated ball valve 84. A ball 86 is held by gravity against a retainer 88 within outlet end cap 48. A pipe or fitting 90 extends from end cap 48 through upper canister wall 20. There is sufficient clearance around ball 86 to permit free passage of air and fuel vapor. However, liquid fuel under pressure is sufficient to overcome the force of gravity on ball 86 so as to urge ball 86 against the lower end of fitting 90 and block flow of liquid therethrough. Valve 76 (FIGS. 1-3) is replaced by an otherwise conventional pressure regulator 92 in the embodiment of FIG. 4. Use of a pressure regulator 92 (with internal biasing spring or the like) in place of valve 76 has the important advantage that it allows controlled pressurization of the entire canister 12. For example, if regulator 92 is set to open at 0.5 psig, then canister 12 would have an internal pressure normally about 0.5 psig. This will assist flow of fuel to the second pump stage help reduce fuel vaporization at elevated temperature, and improve hot fuel handling of the pump second stage.

I claim:

1. A fuel delivery system for an internal combustion engine that comprises:

fuel pump means including a closed canister and a fuel pump within said canister adapted to be disposed in a fuel tank with pump inlet means disposed at a lower portion of the tank for drawing fuel therefrom and pump outlet means for delivering fuel under pressure to the engine, and means for priming said fuel pump means in the event of a low fuel condition in the tank comprising air/-vapor purge valve means opening externally of said canister into the surrounding tank operatively coupled to said pump outlet means, said purge valve means being open when air or vapor is pumped by said fuel pump means to purge such air or vapor to the surrounding tank, and being responsive to presence of liquid fuel under pressure at said outlet means to close and prevent passage of such liquid fuel to the surrounding tank.

2. A fuel delivery system for an internal combustion engine that comprises:

fuel pump means adapted to be disposed in a fuel tank with pump inlet means disposed at a lower portion of the tank for drawing fuel therefrom and pump outlet means for delivering fuel under pressure to the engine including a check valve for preventing reverse flow of fuel from the engine to said pump means, and means for priming said fuel pump means in the event of a low fuel condition in the tank comprising air/-vapor purge valve means operatively coupled to said pump outlet means between said pump means and said check valve, said purge valve means being open when air or vapor is pumped by said fuel pump means to purge such air or vapor to the surrounding tank, and being responsive to presence of liquid fuel under pressure at said outlet means to close and prevent passage of such liquid fuel to the surrounding tank.

3. The system set forth in claim 9 wherein said fuel pump means comprises a module that includes a closed canister and a fuel pump disposed within said canister, said air/vapor purge valve means opening externally of said canister into the surrounding tank.

4. The system set forth in claim 1 wherein said purge valve means is coupled to said outlet means externally of said canister but internally of the tank.

5. The system set forth in claim 1 wherein said pump comprises a housing, said purge valve means being mounted on said housing within said canister and extending through said canister to open into the surrounding tank.

6. The system set forth in claim 1 wherein said purge valve means comprises a valve element and spring means urging said valve element toward said pump outlet means, there being a leakage path around said valve element sufficient to permit passage of air and fuel vapor but insufficient to permit passage of liquid fuel under pressure against force of said spring means.

7. The system set forth in claim 1 further comprising one-way valve means on said canister for venting air and vapor from said canister to the surrounding fuel tank.

8. The system set forth in claim 6 wherein said one-way valve comprises a pressure regulator for pressurizing said canister before venting air and vapor to the surrounding tank.

9. The system set forth in claim 1 wherein said outlet means includes a check valve for preventing reverse flow of fuel from the engine to said pumping means, said purge valve means being operatively coupled to said outlet means between said pump means and said check valve.

* * * * *

UNITED STATES PATENT AND TRADEMARK OFFICE

CERTIFICATE OF CORRECTION

PATENT NO. : 5,263,459

DATED : November 23, 1993

INVENTOR(S) : Edward J. Talaski

It is certified that error appears in the above-identified patent and that said Letters Patent is hereby corrected as shown below:

Column 4, Line 58, change "9" to -- 2 --.

Column 6, Line 3, change "6" to -- 7 --.

Column 6, Line 9, change "pumping" to -- pump --.

Signed and Sealed this

Nineteenth Day of April, 1994

Attest:

BRUCE LEHMAN

Attesting Officer

Commissioner of Patents and Trademarks